(12) United States Patent
Tanimoto et al.

(10) Patent No.: US 6,676,997 B2
(45) Date of Patent: Jan. 13, 2004

(54) METHOD OF FORMING A TWO-LAYER COAT

(75) Inventors: Yoichi Tanimoto, Chiba (JP); Yooichi Abe, Chiba (JP)

(73) Assignee: Dainippon Ink and Chemicals, Inc., Tokyo (JP)

( * ) Notice: Subject to any disclaimer, the term of this patent is extended or adjusted under 35 U.S.C. 154(b) by 26 days.

(21) Appl. No.: 09/984,603

(22) Filed: Oct. 30, 2001

(65) Prior Publication Data

US 2002/0076505 A1 Jun. 20, 2002

(30) Foreign Application Priority Data

Oct. 31, 2000 (JP) ...................... P.2000-332514

(51) Int. Cl.$^7$ ............... B05D 7/02; B05D 7/26
(52) U.S. Cl. ............ 427/407.1; 427/384; 427/385.5; 427/386; 427/412.1; 427/500; 427/514; 427/551; 427/553
(58) Field of Search ............. 427/407.1, 412.1, 427/500, 514, 551, 553, 372.2, 384, 385.5, 386

(56) References Cited

FOREIGN PATENT DOCUMENTS

| EP | 0 761 787 A2 | 3/1997 |
|---|---|---|
| EP | 1 036 834 A1 | 9/2000 |
| JP | 49-92152 | 9/1974 |
| JP | 11-124515 | 5/1999 |
| JP | 2000-063701 | 2/2000 |

OTHER PUBLICATIONS

European Search Report dated May 9, 2003 in corresponding European patent application EP 01–12–5411.

Primary Examiner—Michael Barr
Assistant Examiner—Elena Tsoy
(74) Attorney, Agent, or Firm—Armstrong, Westerman & Hattori, LLP

(57) ABSTRACT

A method of forming a two-layer coat, which comprises the steps of: applying (1) a coating composition onto a thermoplastic resin base and drying the coating to form a colored layer, the coating composition (1) comprising: (A) an acrylic resin obtained by copolymerization of a monomer mixture comprising n-butyl (meth)acrylate and methyl (meth)acrylate, each in an amount of at least 30 wt. %; (B) a colorant; and (C) an organic solvent; applying (2) an energy beam curable overcoat composition onto the colored layer, the overcoat composition (2) comprising: (D) a compound having at least three (meth)acryloyl groups and having a molecular weight of 250 to 1,800; and (E) an acrylic resin obtained by copolymerization of a monomer mixture comprising at least 20 wt. % of methyl (meth)acrylate, the compound (D) amounting to at least 50 wt. % of overcoat film-forming components; and curing the applied overcoat composition by energy beam irradiation.

16 Claims, No Drawings ods of applying various energy beam curable coating compositions, which are cured by exposure to ultraviolet rays or electron beams, has been studied as a coating method for them from the viewpoints of labor saving, improvement in working efficiency and improvement of productivity, each in the application step (JP-A-63701 and JP-A-11-124515 (The term "JP-A" as used herein means an "unexamined published Japanese patent application")).
METHOD OF FORMING A TWO-LAYER COAT

FIELD OF THE INVENTION

The present invention relates to a novel and useful method of forming a 2-way coat. More specifically, the invention pertains to a method of applying, onto a thermoplastic resin base, a coating composition containing: an acrylic resin obtained by copolymerization of a specific monomer mixture; a coloring agent; and an organic solvent, drying the resulting coating to form a colored layer, applying, onto the colored layer, an energy beam curable overcoat composition containing an acrylic resin obtained by copolymerization of a specific monomer mixture, and then curing the overcoat composition by exposure to energy beams, thereby forming a 2-way coat featuring excellent abrasion resistance, interlayer adhesion between the colored layer and the overcoat composition, and adhesion with the thermoplastic resin base.

BACKGROUND OF THE INVENTION

Since thermoplastic resin-molded articles obtained from an ABS resin, poly(methyl methacrylate) resin, polycarbonate resin or polystyrene resin, or a polymer alloy thereof are light in weight and have excellent mechanical physical properties, they have been used for a wide variety of applications such as household electric appliances, automobiles and communication apparatuses.

These molded articles however involve a serious defect such as insufficient abrasion resistance on their surface. With a view to protecting the surface of the molded articles such as mobile phone and to imparting them with good appearance, a method of applying various energy beam curable coating compositions, which are cured by exposure to ultraviolet rays or electron beams, has been studied as a coating method for them from the viewpoints of labor saving, improvement in working efficiency and improvement of productivity, each in the application step (JP-A-63701 and JP-A-11-124515 (The term "JP-A" as used herein means an "unexamined published Japanese patent application")).

In an ultraviolet ray curing system, when such an energy beam curable coating composition is used as a pigmented coating, the pigment absorbs most of ultraviolet rays necessary for curing and ultraviolet rays sufficient for curing are not fed to radical polymerizable unsaturated double bonds, leading to insufficient curing. It was therefore difficult to apply, to the surface of the molded article of a thermoplastic resin, an ultraviolet ray curable coating composition colored with a pigment incorporated therein. Accordingly, a 2-way coating system by applying a pigmented coating on the surface of the molded article of a thermoplastic resin and then applying a transparent type ultraviolet ray curable hard coating composition onto the layer of the pigmented coating, is therefore adopted for coloring of the molded article of a thermoplastic resin.

For example, JP-A-49-92152 discloses a film forming method comprising applying onto a base an undercoat composition comprising an acrylic thermoplastic resin, applying an active energy beam curable coating composition and then exposing it to active energy beams. This patent aims to improve air dryness of the undercoat composition and hence adhesion of the undercoat composition to the base by incorporating a vinyl monomer or an organic solvent having a boiling point of 160° C. or less in the undercoating composition. Such a technique makes it possible to improve the adhesion of the undercoat composition to the base to some extent. When the undercoat composition is a pigmented coating containing a vinyl monomer and a pigment and it is cured by exposure to ultraviolet rays, however, sufficient adhesion with the base material cannot be attained, because the pigment absorbs most of the ultraviolet rays necessary for curing, which prevents sufficient curing of the vinyl monomer.

SUMMARY OF THE INVENTION

An object of the present invention is to provide a very useful method of forming a 2-way coat capable of forming a film excellent in abrasion resistance, interlayer adhesion between a colored layer and an overcoat composition and adhesion with a thermoplastic resin base.

Other objects and effects of the invention will become apparent from the following description.

With a view to attaining the above-described objects, the present inventors made extensive investigations. As a result, it was found that a film excellent in abrasion resistance, interlayer adhesion between the colored layer and overcoat composition and adhesion with the thermoplastic resin base can be obtained by applying a coating composition (1) containing a specific acrylic resin (A), a colorant (B) and an organic solvent (C) onto a thermoplastic resin base, drying the resulting coating to form a colored layer, applying thereto an energy beam curable overcoat composition (2) which contains, as essential components, a compound (D) having at least three (meth)acryloyl groups and a molecular weight of 250 to 1,800 and a specific acrylic resin (E), said compound (D) amounting to 50 wt. % or greater of the overcoat film-forming components, and then curing the overcoat composition by exposure to energy beams. The invention is based on this finding.

Specifically, the present invention provides a method of forming a 2-way coat, which comprises the steps of:

applying (1) a coating composition onto a thermoplastic resin base and drying said coating to form a colored layer, said coating composition (1) comprising:
(A) an acrylic resin obtained by copolymerization of a monomer mixture comprising n-butyl (meth)acrylate and methyl (meth)acrylate, each in an amount of at least 30 wt. %;
(B) a colorant; and
(C) an organic solvent;

applying (2) an energy beam curable overcoat composition onto said colored layer, said overcoat composition (2) comprising:
(D) a compound having at least three (meth)acryloyl groups and having a molecular weight of 250 to 1,800; and
(E) an acrylic resin obtained by copolymerization of a monomer mixture comprising at least 20 wt. % of methyl (meth)acrylate, said compound (D) amounting to at least 50 wt. % of overcoat film-forming components; and curing said applied overcoat composition by energy beam irradiation.

DETAILED DESCRIPTION OF THE INVENTION

The present invention is described in detail below.

As the coating composition (1) to be used in the invention, any coating composition containing, as essential components, an acrylic resin (A) obtained by copolymerization of a monomer mixture comprising n-butyl (meth)acrylate and methyl (meth)acrylate, each in an amount of 30 wt. % or greater, a colorant (B) and an organic solvent (C) may be employed. Among them, particularly preferred are coating compositions produced using an acrylic resin obtained by copolymerization of a monomer mixture containing n-butyl (meth)acrylate and methyl (meth)acrylate, each in an amount of 35 wt. % or greater and in total, 80 wt. % or greater. As the above-described acrylic resin (A), preferred are those having a number-average molecular weight (Mn) of 5,000 to 100,000 and a weight-average molecular weight (Mw) of 10,000 to 200,0000, especially a number-average molecular weight (Mn) of 10,000 to 70,000 and a weight-average molecular weight (Mw) of 20,000 to 150,000.

In the present invention, the terms "number-average molecular weight (Mn)" and "weight-average molecular weight" means, respectively, number-average molecular weight in terms of polystyrene conversion and weight-average molecular weight in terms of polystyrene conversion, each measured by using, as a measuring instrument, Millennium 32 of GPC system of Waters Corp.; as an analysis column, Ultrastyragel 500 Å, $10^3$ Å, $10^4$ Å, $10^5$ Å and $10^6$ Å in series; and as a detector, an RI detector.

Methyl (meth)acrylate contents of the monomer mixture, which is to be used for obtaining the acrylic resin (A), less than 30 wt. % are not preferred, because the glass transition temperature of the resulting acrylic resin (A) is lowered, thereby causing following problems: (i) it retards dry tack of the resulting coating composition (1) and dust tends to adhere to the surface in a coating line, (ii) abrasion resistance of the overcoat composition (2) is lowered, and (iii) the interlayer adhesion between the colored layer and overcoat composition becomes insufficient. Butyl (meth)acrylate contents of the monomer mixture less than 30 wt. % are also not preferred, because the interlayer adhesion between the colored layer and overcoat composition becomes insufficient.

The monomer mixture used for obtaining the acrylic resin (A) contains n-butyl (meth)acrylate and methyl (meth)acrylate as essential components. Among them, use of n-butyl methacrylate and methyl methacrylate in combination is preferred for an improvement in interlayer adhesion between the colored layer and overcoat composition. Other copolymerizable monomers other than n-butyl (meth)acrylate and methyl (meth)acrylate can be used as needed. The other monomer is preferably added in an amount within a range not exceeding 20 wt. % of the monomer mixture constituting the acrylic resin (A).

Typical examples of the other copolymerizable monomer other than n-butyl (meth)acrylate and methyl (meth)acrylate include (meth)acrylic acid, ethyl (meth)acrylate, isopropyl (meth)acrylate, 2-ethylhexyl (meth)acrylate, isobutyl (meth)acrylate, tertiary-butyl (meth)acrylate, n-hexyl (meth)acrylate, lauryl (meth)acrylate, N,N-dimethylaminoethyl (meth)acrylate, stearyl (meth)acrylate, maleic acid, itaconic acid, 2-hydroxyethyl (meth)acrylate, 2-hydroxypropyl (meth)acrylate, styrene, (meth)acrylamide, N-methylol (meth)acrylamide, N-methoxymethyl (meth)acrylamide, N-ethoxymethyl (meth)acrylamide, N-n-butoxymethyl (meth)acrylamide, N-isobutoxymethyl (meth)acrylamide, diacetone (meth)acrylamide, glycidyl (meth)acrylate, vinyl toluene, vinyl acetate, vinyl chloride and (meth)acrylonitrile. The monomer is not limited thereto, and any monomer ordinarily employed for preparation of acrylic resin is usable here.

No particular limitation is imposed on the colorant (B). Examples include organic pigments and inorganic pigments such as extender pigments, white pigments, black pigments, gray pigments, red pigments, brown pigments, green pigments, blue pigments, violet pigments, metallic flake pigments, fluorescent pigments and pearlescent pigments, and plastic pigments, each described in "Coating Material Handbook, 1970 (ed. by Japan Paint Manufacturers Association).

A variety of colorants can be given as examples of the colorant (B). Organic pigments include, for example, insoluble azo pigments such as Benzidine Yellow, Hansa Yellow and Lake Red 4R, soluble azo pigments such as Lake Red C, Carmine 6B and Bordeaux 10, (copper) phthalocyanine pigments such as Phthalocyanine Blue and Phthalocyanine Green, basic dye lakes such as Rhodamine Lake and Methyl Violet Lake, mordant dye type pigments such as Quinoline Lake and Fast Sky Blue, vat dye type pigments such as anthraquinone pigments, thioindigo pigments and perinone pigments, quinacridone pigments such as Cinquasia Red B, dioxazine pigments such as Dioxazine Violet, condensed azo pigments such as chromophthal pigments and aniline black.

Examples of the inorganic pigment include chromates such as Chrome Yellow, Zinc Chromate and Molybdate Orange; ferrocyanide compounds such as iron blue pigments; metal oxides such as Titanium Oxide, Zinc Oxide, Mapico Yellow, Iron Oxide, Red Oxide and Chrome Oxide Green; sulfides or selenides such as Cadmium Yellow, Cadmium Red and Mercury Sulfide; sulfates such as Barium Sulfate and Lead Sulfate; silicates such as Calcium Silicate and Ultramarine Blue; carbonates such as Calcium Carbonate and Magnesium Carbonate; phosphates such as Cobalt Violet and Manganese Violet; metallic power pigments such as aluminum powder, gold powder, silver powder, copper powder, bronze powder and brass powder; flake pigments or mica flake pigments of these metals; metallic pigments or pearlescent pigments such as mica flake pigments covered with a metal oxide and mica-state iron oxide pigments; and graphite and carbon black.

Examples of the extender pigment include precipitated barium sulfate, precipitated calcium carbonate, calcium bicarbonate, white (Japanese) marble, alumina white, silica, hydrous fine silica particles (white carbon), anhydrous ultrafine silica particles (aerosil), silica sand, talc, precipitated magnesium carbonate, bentonite, clay, kaolin and Chinese Yellow.

In addition, plastic pigments (for example, "Grandol PP-1000, PP-2000S", each product of Dainippon Ink & Chemicals, Inc.) are usable.

A ratio of the colorant (B) to the acrylic resin (A) contained in the coating composition (1) of the invention varies depending on the kind of the colorant, desired color hue, composition of the acrylic resin (A) or the like. Although no particular limitation is imposed on it, the colorant (B) is usually added in an amount ranging from 2 to 40 parts by weight per 100 parts by weight of the acrylic resin (A).

As the organic solvent (C) to be used in the invention, that having a boiling point of 50 to 180° C. is usually preferred, because a coating composition obtained using it is excellent in working efficiency upon application and drying properties before or after curing. Specific examples include alcohol solvents such as methanol, ethanol, isopropanol, n-butanol and isobutanol, ester solvents such as methyl acetate, ethyl acetate, butyl acetate, ethylene glycol monoethyl ether, ethylene glycol monoethyl ether acetate and ethylene glycol monobutyl ether, ketone solvents such as acetone, methyl ethyl ketone and methyl isobutyl ketone, aromatic solvents such as toluene and xylene and cyclic ether solvents such as dioxane. These organic solvents may be used either singly or in combination as a mixture. Although no particular limitation is imposed on the amount of the organic solvent (C), it is usually added to give a concentration of the film-forming components in the coating composition (1) within a range of 5 to 40 wt. %.

To the coating composition (1) of the invention, a natural or synthetic polymer substance (G) other than the acrylic resin (A), other additive (H) and the like may be added.

Typical examples of the natural or synthetic polymer substance (G) other than the acrylic resin (A) include various epoxy vinyl ester resins, epoxy resins, acrylic resins other than the acrylic resin (A), alkyd resins, urea resins, melamine resins, polyvinyl acetate, vinyl acetate copolymers, polybutadiene elastomers, saturated polyesters, saturated polyethers, celluloses such as nitrocellulose, ethyl cellulose, acetyl cellulose, butyl cellulose and acetyl butyl cellulose; and polymerizable cellulose derivatives obtained by introducing a polymerizable unsaturated double bond to the above-exemplified cellulose derivatives.

Examples of the other additive (H) include antioxidants, ultraviolet absorbers, leveling agents, surfactants, slip agents, and anti-foaming agents.

The energy beam curable overcoat composition (2) to be used in the invention comprises, as essential components, a compound (D) having at least 3 (meth)acryloyl groups and a molecular weight of 250 to 1,800; and an acrylic resin (E) obtained by copolymerization of a monomer mixture containing, as an essential component, methyl (meth) acrylate in an amount of 20 wt. % or greater. At the same time, the content of the compound (D) must be 50 wt. % or greater in the overcoat film-forming components, with 55 wt. % or greater being especially preferred. Contents of the compound (D) in the overcoat film-forming components less than 50 wt. % are not preferred, because the crosslinking density of the cured film obtained by exposure to energy beams is insufficient, whereby excellent abrasion resistance cannot be imparted to the cured film. The overcoat composition free of the acrylic resin (E) or containing a resin other than the acrylic resin (E) is not preferred, because the interlayer adhesion of it with the colored layer becomes insufficient.

Examples of the above-described compound (D) having at least 3 (meth)acryloyl groups and having a molecular weight of 250 to 1,800 include (meth)acrylate compounds (D1) having a molecular weight of 550 to 1,800 obtained by reacting a compound having at least 2 isocyanate groups with a hydroxyl-containing (meth)acrylate compound to give a total number of (meth)acryloyl groups of 3 or greater, (meth)acrylate compounds (D2) having a molecular weight of 250 to 1,800 obtained by reacting at least 3 alcoholic hydroxyl groups of polyols having at least 3 hydroxyl groups, and (meth)acrylate compounds (D3) having a molecular weight of 550 to 1,500 obtained by reacting an epoxy compound having at least 3 epoxy groups with (meth)acrylic acid. Of these, compounds having a molecular weight of 550 to 1,500, 250 to 1,500 and 550 to 1,500 are preferred as the (meth)acrylate compounds (D1), (D2) and (D3), respectively, of which the compounds having 4 to 6 (meth)acryloyl groups are particularly preferred.

As the (meth)acrylate compound (D1), preferred are polyfunctional (meth)acrylates obtained by reacting a compound having 2 to 3 isocyanate groups with a hydroxyl-containing (meth)acrylate compound, while using them in combination so that the total number of (meth)acryloyl groups is 3 or greater.

Examples of the above-described compound having 2 or 3 isocyanate groups include aliphatic or alicyclic diisocyanate compounds such as hexamethylene diisocyanate, isophorone diisocyanate, xylene diisocyanate, hydrogenated xylene diisocyanate and dicyclohexylmethane diisocyanate, aromatic diisocyanates such as toluene diisocyanate and 4,4'-diphenylmethane diisocyanate and isocyanurate type triisocyanates which are a trimer of a diisocyanate compound.

Examples of the hydroxyl-containing (meth)acrylate include ethylene glycol mono(meth)acrylate, propylene glycol mono(meth)acrylate, 1,4-butanediol mono(meth)acrylate, diethylene glycol mono(meth)acrylate, dipropylene glycol mono(meth)acrylate, triethylene glycol mono (meth)acrylate, tripropylene glycol mono(meth)acrylate, polyethylene glycol mono(meth)acrylate, polypropylene glycol mono(meth)acrylate, 2-hydroxyethyl (meth)acrylate, 2-hydroxypropyl (meth)acrylate, 2-hydroxybutyl (meth)acrylate, caprolactone-modified 2-hydroxyethyl (meth)acrylate, tris-2-hydroxyethyl isocyanurate di(meth)acrylate, pentaerythritol tri(meth)acrylate and dipentaerythritol penta (meth)acrylate.

Upon obtaining the above-described (meth)acrylate compound (D1), a portion of the hydroxyl-containing (meth)acrylate compound to be reacted with the compound having at least 2 isocyanate groups may be substituted with a trihydric to tetrahydric alcohol prior to polymerization.

Examples of the above-described (meth)acrylate compound (D2) include (i) tri(meth)acrylates of a triol, (ii) polyfunctional (meth)acrylates obtained by (meth)acrylating at least 3 alcoholic hydroxyl groups of a polyhydric alcohol having at least 4 alcoholic hydroxyl groups, (iii) polyfunctional (meth)acrylates obtained by modifying a portion of alcoholic hydroxyl groups of the above-described polyhydric alcohol having at last 4 alcoholic hydroxyl groups with an alkyl group or ε-caprolactone and then (meth)acrylating the remaining at least 3, on average, of the hydroxyl groups, and (iv) polyfunctional (meth)acrylates obtained by esterifying a polyhydric alcohol with a polybasic acid and then (meth)acrylating the resulting ester polyol having at least three hydroxyl groups.

Examples of the triol used in the above-described (i) include trimethylolpropane, ethoxylated trimethylolpropane, propoxylated trimethylolpropane, tris-2-hydroxyethyl isocyanurate and glycerin. Examples of the polyhydric alcohol having at least 4 alcoholic hydroxyl groups used in the above-described (ii) or (iii) include pentaerythritol, dipentaerythritol and ditrimethylolpropane. Examples of the polyhyric alcohol used in the above-described (iv) include ethylene glycol, propylene glycol, diethylene glycol, neopentyl glycol, bisphenol A, hydrogenated bisphenol A, ethoxylated bisphenol A, ethoxylated hydrogenated bisphenol A, propoxylated bisphenol A, propoxylated hydrogenated bisphenol A and the above-exemplified polyhydric alcohols having at least 3 hydroxyl groups. Examples of the polybasic acid include phthalic anhydride, isophthalic acid, terephthalic acid, adipic acid, tetrahydrophthalic anhydride, hexahydrophthalic anhydride, maleic anhydride, fumaric acid, trimellitic anhydride and pyromellitic anhydride.

Examples of the above-described (meth)acrylate compounds (D3) include (1) tri(meth)acrylates obtained by reacting (meth)acrylic acid with an epoxy compound such as triglycidyl-ether of trihydric alcohol, (2) polyfunctional aromatic epoxy (meth)acrylates obtained by reacting (meth) acrylic acid with phenol novolac epoxy resin or cresol novolac epoxy resin or glycidyl-ether of alkylene oxide modified novolak resins, and (3) polyfunctional alicyclic epoxy (meth)acrylates which are hydrogenation type of the above-exemplified polyfunctional aromatic epoxy (meth) acrylates.

Examples of the trihydric alcohol used in the above-described (1) include trimethylolpropane, ethoxylated trimethylolpropane, propoxylated trimethylolpropane and glycerin.

Among the compounds (D) having at least 3 (meth) acryloyl groups and a molecular weight of 250 to 1,800, the meth(acrylate) compounds (D1) having a molecular weight of 550 to 1,800 obtained by reacting a compound having at least 2 isocyanate groups with a hydroxyl-containing (meth) acrylate compound, while using them in combination so that the total number of (meth)acryloyl groups is 3 or greater; and the (meth)acrylate compounds (D2) having a molecular weight of 250 to 1,800 obtained by reacting at least 3 alcoholic hydroxyl groups of a polyhydric alcohol having at least 3 hydroxyl groups with (meth)acrylic acid are particularly preferred for good abrasion resistance of a cured film.

Specific preferred examples of the (meth)acrylate compound (D1) include acrylate having 4 acryloyl groups, which acrylate has tris(2-hydroxyethyl)isocyanurate diacrylate bonded to two isocyanate groups of dicyclohexylmethane diisocyanate; acrylate having 5 acryloyl groups, which acrylate has tris(2-hydroxyethyl)isocyanurate diacrylate bonded to one end of the two isocyanate groups of isophorone diisocyanate and pentaerythritol triacrylate bonded to the other end; acrylate having 6 acryloyl groups which acrylate has pentaerythritol triacrylate bonded to two isocyanate groups of isophorone diisocyanate, acrylate having 6 acryloyl groups, which acrylate has pentaerythritol triacrylate bonded to 2 isocyanate groups of hexamethylene diisocyanate; and acrylate having 6 acryloyl groups which acrylate has pentaerythritol triacrylate bonded to 2 isocyanate groups of dicyclohexylmethane diisocyanate.

Specific preferred examples of the above-described (meth)acrylate compound (D2) include acrylates such as pentaerythritol triacrylate, pentaerythritol tetraacrylate, ditrimethylolpropane tetraacrylate, tris(2-hydroxyethyl) isocyanurate triacrylate, dipentaerythritol pentaacrylate and dipentaerythritol hexaacrylate; and acrylates having 4 acryloyl groups, which acrylates are obtained by reacting acrylic acid with a polyester polyol having 4 hydroxyl groups, which polyester polyol has pentaerythritol and ethylene-oxide-modified bisphenol A bonded, each 1 mole, respectively to 2 carboxyl groups of adipic acid or succinic acid.

The energy beam curable overcoat composition (2) contains, in addition to the above-described compound (D), an acrylic resin (E) obtained by copolymerizing a monomer mixture containing as an essential component at least 20 wt. % of methyl (meth)acrylate. The monomer mixture usable here may contain, in addition to methyl (meth)acrylate, other copolymerizable monomers other than methyl (meth) acrylate if necessary. As this other copolymerizable monomer, usable are n-butyl (meth)acrylate and copolymerizable monomers exemplified above as raw materials of the above-described acrylic resin (A) other than n-butyl (meth) acrylate and methyl (meth)acrylate. Among them, n-butyl (meth)acrylate is preferred for improvement of interlayer adhesion with the colored layer, with n-butyl methacrylate being particularly preferred.

As the above-described acrylic resin (E), acrylic resins obtained by copolymerization of a monomer mixture containing, as essential components, n-butyl (meth)acrylate and methyl (meth)acrylate, each in an amount of 20 wt. % or greater are preferred, because a 2-way coat well-balanced between abrasion resistance and interlayer adhesion with the colored layer is obtained thereby. Among them, acrylic resins obtained by copolymerization of a monomer mixture containing, as essential components, n-butyl (meth)acrylate and methyl (meth)acrylate, each in an amount of 30 wt. % or greater are especially preferred. The acrylic resins (E) having a number-average molecular weight (Mn) of 5,000 to 100,000 and a weight-average molecular weight (Mw) of 10,000 to 200,000 are more preferred, of which those having a number-average molecular weight (Mn) of 10,000 to 70,000 and a weight-average molecular weight (Mw) of 20,000 to 150,000 are still more preferred.

The acrylic resin (E) does not necessarily have a (meth) acryloyl group.

The weight ratio of the compound (D) having at least 3 (meth)acryloyl groups and a molecular weight of 250 to 1,800 to the acrylic resin (E), that is, (D)/(E) preferably falls within a range of 95/5 to 50/50, with a range of 92/8 to 55/45 being particularly preferred, because an overcoat composition having excellent interlayer adhesion with the colored layer is obtained thereby.

To the energy beam curable overcoat composition (2), a compound (F) having two or less radical polymerizable unsaturated double bonds may be added as an overcoat film-forming component, in addition to the above-described compound (D) and acrylic resin (E).

Although no particular limitation is imposed on the amount of the above-described compound (F) having two or less radical polymerizable unsaturated double bonds insofar as its content in the film-forming components of the energy beam curable overcoat composition (2) is within a range of 40 wt. % or less and does not permit lowering of abrasion resistance and interlayer adhesion between the colored layer and overcoat composition, it is usually added to give its content of 5 to 30 wt. % in the film-forming components of the energy beam curable overcoat composition (2).

Specific examples of the compound (F) having two or less radical polymerizable unsaturated double bonds include 2-hydroxyethyl (meth)acrylate, 2-hydroxypropyl (meth) acrylate, 2-hydroxybutyl (meth)acrylate, n-butyl (meth) acrylate, isobutyl (meth)acrylate, t-butyl (meth)acrylate, glycidyl (meth)acrylate, acryloyl morpholine, N-vinylpyrrolidone, tetrahydrofurfuryl acrylate, cyclohexyl (meth)acrylate, 2-ethylhexyl (meth)acrylate, isobornyl (meth)acrylate, isodecyl (meth)acrylate, lauryl (meth) acrylate, tridecyl (meth)acrylate, cetyl (meth)acrylate, stearyl (meth)acrylate, benzyl (meth)acrylate, 2-ethoxyethyl (meth)acrylate, 3-methoxybutyl (meth)acrylate, ethylcarbitol (meth)acrylate, phenoxy (meth)acrylate, phosphoric acid (meth)acrylate, ethylene-oxide-modified phosphoric acid (meth)acrylate, ethylene-oxide-modified phenoxy (meth) acrylate, propylene-oxide-modified phenoxy (meth)acrylate, nonylphenol (meth)acrylate, ethylene-oxide-modified nonylphenol (meth)acrylate, propylene-oxide-modified nonylphenol (meth)acrylate, methoxydiethylene glycol (meth) acrylate, methoxypolyethylene glycol (meth)acrylate, methoxypropylene glycol (meth)acrylate, 2-(meth) acryloyloxyethyl-2-hydroxypropyl phthalate, 2-hydroxy-3-phenoxypropyl (meth)acrylate, 2-(meth)acryloyloxyethyl hydrogen phthalate, 2-(meth)acryloyloxypropyl hydrogen phthalate, 2-(meth)acryloyloxypropyl hexahydrogen phthalate, 2-(meth)acryloyloxypropyl tetrahydrohydrogen phthalate, dimethylaminoethyl (meth)acrylate, trifluoroethyl (meth)acrylate, tetrafluoropropyl (meth)acrylate, hexafluoropropyl (meth)acrylate, octafluoropropyl (meth)acrylate; adamantan derivative mono(meth)acrylates, such as adamantyl acrylate, which has been derived from 2-adamantan or adamantan diol and has a mono(meth)acrylate; di(meth) acrylates such as ethylene glycol di(meth)acrylate, diethylene glycol di(meth)acrylate, butanediol di(meth)acrylate, hexanediol di(meth)acrylate, nonanediol di(meth)acrylate, ethylene-oxide-added hexanediol di(meth)acrylate, propylene-oxide-added hexanediol di(meth)acrylate, polyethylene glycol di(meth)acrylate, tripropylene glycol di(meth)acrylate, polypropylene glycol di(meth)acrylate, neopentyl glycol di(meth)acrylate, ethoxylated neopentyl glycol di(meth)acrylate, glycerin methacrylate acrylate, and hydroxypivalic acid neopentyl glycol di(meth)acrylate; monovinyl ethers and divinyl ethers of a monohydric or dihydric alcohol such as ethyl vinyl ether, n-propyl vinyl ether, isopropyl vinyl ether, n-butyl vinyl ether, isobutyl vinyl ether, octadecyl vinyl ether, cyclohexyl vinyl ether, butanediol monovinyl ether, cyclohexanedimethanol monovinyl ether, t-butyl vinyl ether, t-amyl vinyl ether, ethylhexyl vinyl ether, dodecyl vinyl ether, ethyleneglycol monovinyl ether, ethyleneglycol divinyl ether, ethyleneglycol butyl vinyl ether, hexanediol monovinyl ether, diethyleneglycol monovinyl ether, diethyleneglycol divinyl ether and triethyleneglycol methyl vinyl ether; bisphenol F diacrylate, ethylene-oxide-modified bisphenol F diacrylate, bisphenol A diacrylate, ethylene-oxide-modified bisphenol A diacrylate and ethylene-oxide-modified isocyanuric acid diacrylate; and various energy beam curable resins typified by urethane acrylate, ester acrylate and epoxy acrylate each having less than 3, on average, radical polymerizable unsaturated double bonds.

The above-exemplified compounds (F) having two or less radical polymerizable unsaturated double bonds may be used either singly or in combination.

To the energy beam curable overcoat composition (2) used in the invention, an organic solvent (C'), a natural or synthetic polymer substance (G') other than the acrylic resin (E), other additive (H'), photopolymerization initiator (I), matting agent (J) and the like can be added according to the using purpose, in addition to the above-described three components, that is, the compound (D) having at least 3 (meth)acryloyl groups and molecular weight of 250 to 1,800, the acrylic resin (E) and the compound (F) having two or less radical polymerizable unsaturated double bonds.

As the organic solvent (C'), the natural or synthetic polymer substance (G') other than the acrylic resin (E) and the other additive (H'), those exemplified above in the coating composition (1) as the organic solvent (C), and the natural or synthetic polymer substance (G) other than the acrylic resin (E) and other additive (H) to be added according to the using purpose are usable, respectively.

Although no particular limitation is imposed on the amount of the organic solvent (C'), it is usually added so that its concentration in the film-forming components of the energy beam curable overcoat composition (2) falls within a range of 5 to 40 wt. %.

As the photopolymerization initiator (I), various types are usable. Representative ones which generate a radical by hydrogen abstraction include benzophenone, benzyl, Michler's ketone, thioxanthone and anthraquinone. These compounds are usually used in combination with a tertiary amine such as methylamine, diethanolamine, N-methyldiethanolamine or tributylamine. On the other hand, those generating a radical by intramolecular cleavage include benzoin, dialkoxyacetophenone, acyloxime ester, benzyl ketal, hydroxyalkylphenone and halogenoketone.

When the above-described photopolymerization initiator (I) is used, a polymerization inhibitor such as hydroquinone, hydroquinone monomethyl ether, benzoquinone or para-tertiary butyl catechol can be added as needed.

Typical examples of the matting agent (J) include calcium carbonate, talc, mica, clay, silica powder, colloidal silica, aluminum hydroxide and zinc stearate.

In the method of forming a 2-way coat according to the invention, employed is a double coating system in which after formation of a colored layer by applying the coating composition (1) to a thermoplastic resin base and drying, an energy beam curable overcoat composition (2) is applied to the colored layer. The overcoat composition (2) is then cured by exposure to energy beams such as ultraviolet rays, visible rays, laser beams, electron beams, X-rays, γ-rays, plasmas or microwaves, whereby the coat is formed.

A description will next be made of a more specific method of the invention for forming a 2-way coat.

Formation of a 2-way coat on a thermoplastic resin base according to the method of the invention is preferably carried out by an in-line coating system usually at a line speed of 3 to 10 m/min. First, in application of the coating composition (1), a base such as a thermoplastic resin-molded article is mounted on a production line, followed by cleaning and destaticizing operations in order to prevent adhesion of dusts onto the film and generation of seeding. The coating composition (1) is then diluted with the organic solvent (C). After adjustment of the concentration of the film-forming components to 5 to 40 wt. %, the diluted coating composition is applied in a first booth to give a dry film thickness of 3 to 15 $\mu$m by a spray gun or the like. The organic solvent (C) is then evaporated and removed by heat drying, whereby a colored film is formed. Heat drying is usually conducted at 55 to 80° C. for 3 to 15 minutes preferably in a drying stove using far infrared rays or hot air. In a second booth, then, the energy beam curable overcoat composition (2), which has been diluted with the organic solvent (C') so as to give a concentration of the overcoat film-forming components of 5 to 40 wt. %, is applied onto the colored layer to give a dry film thickness of 5 to 20 $\mu$m by a spray gun. The organic solvent (C') is then evaporated and removed by heat drying. As in the heat drying of the film of the coating composition (1), heat drying is usually conducted at 55 to 80° C. for 3 to 15 minutes preferably in a drying stove using far infrared rays or hot air. The film thus heat dried is exposed to energy beams in an energy beam irradiation reactor to cure the overcoat composition (2), whereby an abrasion-resistant colored film is formed on the base.

When ultraviolet rays are used as energy beams, a luminescent lamp, flash, laser, electrodeless lamp or the like system can be employed as an ultraviolet lamp emitting ultraviolet rays. Usually, curing by exposure to ultraviolet rays through a high-pressure mercury lamp, which adopts a fluorescent lamp system, is preferably conducted under the conditions of an integrated illuminance of ultraviolet rays of 300 to 1,500 mJ/cm$^2$ Since energy beam curing instantly forms a hard film, the film tends to have a strain upon curing and fractures or cracks happen to appear in the film. For inhibiting these defects, sufficient drying of the colored layer, thereby reducing the amount of the organic solvent remaining in the film is particularly preferred.

When the energy beam curable overcoat composition (2) is cured using an electron beam curing system, the colorant (B) may be incorporated in the energy beam curable overcoat composition (2) because it is known that the electron beam curing system does not cause a marked curing failure even in the coloring system containing a pigment.

Examples of the thermoplastic resin base include thermoplastic resin-molded articles produced from ABS resins (acrylonitrile-butadiene-styrene copolymers), poly(methyl methacrylate) resins, polycarbonate resins and polystyrene resins, and polymer alloys thereof. Among them, preferred are thermoplastic resin-molded articles produced from an ABS resin or a polymer alloy containing an ABS resin, for example, an alloy of an ABS resin and a polycarbonate resin.

EXAMPLES

The present invention will be illustrated in greater detail with reference to the following Examples and Comparative Examples, but the invention should not be construed as being limited thereto. All the "part(s)" and "%" are given by weight unless otherwise indicated.

Synthesis Example 1
Preparation of Acrylic Resin (A)

Into a 2-liter clean separable flask equipped with a stirrer, a gas inlet tube, a condenser, a dropping funnel and a thermometer, a nitrogen gas was blown to purge therewith the air in the flask. In the flask, 275 parts of toluene and 275 parts of n-butanol were charged. The resulting mixture was heated to 110° C. while stirring. Through the dropping funnel, a premix containing 180 parts of methyl methacrylate, 270 parts of n-butyl methacrylate, 2 parts of "Perbutyl O" (t-butyl peroxy-2-ethylhexanoate; product of Nippon Oils & Fats Co., Ltd.) and 2 parts of "Perbutyl Z" (t-butylperoxybenzoate, product of Nippon Oils & Fats Co., Ltd.) was added dropwise over 4 hours. After completion of the dropwise addition, the reaction mixture was kept at 110° C. for 6 hours, whereby 997 parts of an acrylic resin solution (nonvolatile content; 45.3%, Gardner viscosity (25° C.): X, Gardner color: 1 or less, number-average molecular weight (Mn) of the acrylic resin: 30,000, weight-average molecular weight (Mw) of the acrylic resin: 72,000) was obtained. This solution is designated as "Acrylic resin solution (A1)".

Synthesis Example 2
Preparation of Acrylic Resin (A)

In a similar manner to Synthesis Example 1 except for the use of a premix containing 270 parts of methyl methacrylate, 180 parts of n-butyl methacrylate, 2 parts of Perbutyl O and 2 parts of Perbutyl Z, 998 parts of an acrylic resin solution (nonvolatile content; 45.3%, Gardner viscosity (25° C.): V, Gardner color: 1 or less, number-average molecular weight (Mn) of the acrylic resin: 19,000, weight-average molecular weight (Mw) of the acrylic resin: 46,000) was obtained. This solution is designated as "Acrylic resin solution (A2)".

Synthesis Example 3
Preparation of Acrylic Resin (A)

In a similar manner to Synthesis Example 1 except for the use of a premix containing 202.5 parts of methyl methacrylate, 202.5 parts of n-butyl methacrylate, 45 parts of β-hydroxyethyl methacrylate, 2 parts of Perbutyl O and 2 parts of Perbutyl Z, 998 parts of an acrylic resin solution (nonvolatile content; 45.0%, Gardner viscosity (25° C.): V, Gardner color: 1 or less, number-average molecular weight (Mn) of the acrylic resin: 28,000, weight-average molecular weight (Mw) of the acrylic resin: 60,000) was obtained. This solution is designated as "Acrylic resin solution (A3)".

Synthesis Example 4
Preparation of Acrylic Resin (A)

In a similar manner to Synthesis Example 1 except that 300 parts of toluene and 300 parts of n-butanol were charged in a separable flask, and that a premix containing 320 parts of methyl methacrylate, 80 parts of isobutyl methacrylate, 2 parts of Perbutyl O and 2 parts of Perbutyl Z, was used, an acrylic resin solution (nonvolatile content; 39.6%, Gardner viscosity (25° C.): U, Gardner color: 1 or less, number-average molecular weight (Mn) of the acrylic resin: 34,000, weight-average molecular weight (Mw) of the acrylic resin: 73,000) was obtained. This solution is designated as "Acrylic resin solution (A4)".

Synthesis Example 5
Preparation of Acrylic Resin (A)

In a similar manner to Synthesis Example 1 except that 500 parts of toluene was used instead of 275 parts of toluene and 275 parts of n-butanol, and that a premix containing 325 parts of methyl methacrylate, 100 parts of n-butyl methacrylate, 50 parts of styrene, 25 parts of methacrylic acid, 2 parts of Perbutyl O and 2 parts of Perbutyl Z was used, an acrylic resin solution (nonvolatile content; 51.0%, Gardner viscosity (25° C.): V, Gardner color: 1 or less, number-average molecular weight (Mn) of the acrylic resin: 16,000, weight-average molecular weight (Mw) of the acrylic resin: 40,000) was obtained. This solution is designated as "Acrylic resin solution (A5)".

Synthesis Example 6
Preparation of Compound (D)

Into a 1-liter clean four-necked flask equipped with a stirrer, a gas inlet tube, a condenser and a thermometer, a dry air was blown to purge therewith the air in the flask. In the flask, then, 651.6 parts of "Aronix M-305" (pentaerythritol triacrylate; product of Toagosei Co., Ltd., Gardner viscosity (25° C.); R, hydroxyl number: 130), 2.4 parts of "Sumilizer BHT" (antioxidant of Sumitomo Chemical Co., Ltd.), 0.2 part of "Methoquinone" (hydroquinone monomethylether, polymerization inhibitor of Seika Kagaku Kogyo), 0.1 part of dibutyltin diacetate and 200 parts of butyl acetate were charged. The mixture was stirred uniformly and heated to 70° C. In the flask, then, 145.7 parts of isophorone diisocyanate was added in portions while monitoring exothermic heat. The mixture was heated to 80° C. and maintained at this temperature for 4 hours, whereby 996 parts of a solution of an acrylate compound (nonvolatile content: 80.3%, Gardner viscosity (25° C.): O-P, Gardner color: 1 or less) having a molecular weight of 1056 was obtained. As a result of IR measurement, disappearance of the peak of this urethane acrylate resin at 2240 $cm^{-1}$ resulting from an isocyanate group was confirmed. This solution is designated as "Acrylate compound solution (D-1)". The molecular weight of the above-described acrylate compound was measured by using, as a measuring instrument, Millennium 32 of GPC system of Waters Corp.; as an analysis column, Ultrastyragel 500 Å, $10^3$ Å, $10^4$ Å, $10^5$ Å and $10^6$ Å in series; and as a detector, an RI detector. The molecular weight (molecular weight in terms of polystyrene conversion) indicated by the main peak of the measurement chart thus obtained was adopted.

Examples 1 to 6 and Comparative Examples 1 to 4
Preparation of Coating Compositions (1-1) to (1-5) and Formation of Colored Films Coating compositions (1-1) to (1-5) were prepared by mixing each of Acrylic resin solutions (A-1) to (A-5), pyroxylin ("H1/4 pyroxylin", product of Asahi Kasei Corp.), an aluminum paste ("ALPASTE 1109-MA", product of Toyo Aluminum K.K., grain size D50: 18 µm, nonvolatile content: 64%) and carbon black ("MA-100" product of Mitsubishi Chemical Corp., particle size: 22 µm) as indicated in Table 1. The pigment weight concentration (P.W.C.; wt. % of a pigment in coating solid content) of each of the resulting coating compositions (1-1) to (1-5) is also shown in Table 1.

After dilution of the resulting coating compositions (1-1) to (1-5) with a thinner having the below-described composition so that the viscosity as measured by Ford Cup #4 would be 10 seconds at 25° C., the diluted coating composition was applied to an ABS resin plate by spraying, followed by drying under heat at 70° C. for 10 minutes in a hot-air oven, whereby coated plates (P-1) to (P-5) having a colored layer of 10 µm thick were obtained.

Composition of the thinner: xylene/toluene/ethyl acetate/butyl acetate/cellosolve acetate=25/40/15/10/10 (wt. %)

TABLE 1

| | | Coating compositions | | | | |
|---|---|---|---|---|---|---|
| | | (1-1) | (1-2) | (1-3) | (1-4) | (1-5) |
| Acrylic | (A1) | 100 | | | | |
| resin | (A2) | | 100 | | | |
| solution | (A3) | | | 100 | | |
| (parts) | (A4) | | | | 100 | |
| | (A5) | | | | | 100 |
| Pyroxylin (parts) | | 5 | | | | |
| Aluminum paste (parts) | | 7.8 | 7.0 | | 6.3 | |
| Carbon black (parts) | | | | 15.8 | | 17.5 |
| P.W.C (%) | | 10 | 10 | 35 | 10 | 35 |
| Coated plate | | (P-1) | (P-2) | (P-3) | (P-4) | (P-5) |

Preparation of Energy Beam Curable Overcoat Compositions (2-1) to (2-5)

Energy beam curable overcoat compositions (2-1) to (2-5) were prepared by mixing Acrylate compound solution (D-1), "Aronix M-305" (pentaerythritol triacrylate; product of Toagosei Co., Ltd., Gardner viscosity (25° C.): R), "Aronix TO-1450" (tetrafunctional type ester acrylate, product of Toagosei Co., Ltd., Gardner viscosity (25° C.): $Z_1$), "Karayad DPHA" (dipentaerythritol hexaacrylate, product of Nippon Kayaku Co., Ltd., Gardner viscosity (25° C.): $Z_4^3$–$Z_5$), "Neomer NA-305" (propoxylated neopentyl glycol diacrylate, Gardner viscosity (25° C.): A–$A_1$), Acrylic resin solution (A-1) (used as the acrylic resin (E)), n-butyl acetate and "Irgacure 184" (1-hydroxy-cyclohexyl-phenyl-ketone, product of Ciba Specialty Chemicals) at a composition as shown in Table 2. The concentration of a nonvolatile content, appearance and viscosity (Gardner viscosity at 25° C.) of the resulting overcoat compositions are shown in Table 2.

TABLE 2

| | | Overcoat | | | | |
|---|---|---|---|---|---|---|
| | | (2-1) | (2-2) | (2-3) | (2-4) | (2-5) |
| Acrylate compound solution (D-1) | (parts) | 37.0 | | | 45.0 | 32.0 |
| "Aronix M-305" | (parts) | | 5.0 | | | |
| "Aronix TO-1450" | (parts) | | 15.0 | | | |
| "Karayad DPHA" | (parts) | 30.0 | 52.0 | 45.0 | | |
| "Neomer NA-305" | (parts) | | | | 44.0 | |
| Acrylic resin solution (A-1) | (parts) | 33.0 | 18.0 | 55.0 | | 68.0 |
| n-butyl acetate | (parts) | | 10.0 | | 11.0 | |
| "Irgacure #184" | (parts) | 3.0 | 3.2 | 2.8 | 3.2 | 2.3 |
| Nonvolatile content of coating composition | (%) | 74.5 | 80.1 | 80.0 | 80.0 | 56.1 |
| Appearance of coating composition | | Clear | Clear | Clear | Clear | Clear |
| Viscosity of coating composition | | R | L-H | X-$Y^3$ | $A_2$-$A_3$ | V-W |

Application and Curing of Energy Beam Curable Overcoat Compositions and Evaluation Thereof After application of energy beam curable overcoat compositions (2-1) to (2-5) to coated plates (P-1) to (P-5) by a bar coater to give a film thickness of 10 µm as shown in Tables 3(1) and (2) and drying under heat at 70° C. for 10 minutes in a hot air oven, the overcoat compositions were exposed to ultraviolet rays by allowing the plates to pass under a high-pressure mercury lamp of 160 W/cm once from a distance of 15 cm at a rate of 5 m/min to cure the films. Adhesion, abrasion resistance and moisture resistance tests of the resulting cured films were made as described below and they were evaluated. The results are shown in Tables 3(1) and (2).

Adhesion Test: On the cured film, 100 cross-cuts were formed at intervals of 1 mm by a cutter knife. After contact bonding of an adhesive cellophane tape to the resulting film, the tape was peeled from the film strongly and the remaining ratio of the film was determined (JIS K-5400).

Abrasion Resistance Test: The film surface was rubbed by a #0000 steel wool under a load of 220 g/cm$^2$ by 100 reciprocations and the appearance of the film was visually observed. The film without abnormalities was ranked "A", the film having slight scratches on its surface was ranked "B", and the film having marked scratches on its surface was ranked "C".

Moisture Resistance Test: After storage of a sample for 120 hours in a thermo-hygrostat kept at temperature of 65° C. and humidity of 95%, the appearance of the film was visually observed. The film without abnormalities was ranked "A", the film having blotches was ranked "B", and the film from which whitening or color change was observed was ranked "C".

Warm Water Resistance Test: After immersion of each sample in warm water of 70° C. for 5 hours, adhesion test was made and at the same time, appearance of it was visually observed. The film without abnormalities was ranked "A", the film with blotches was ranked "B" and the film from which whitening or color change was observed was ranked "C".

TABLE 3(1)

| | Examples | | | | |
|---|---|---|---|---|---|
| | 1 | 2 | 3 | 4 | 5 |
| Coated plate | (P-1) | (P-1) | (P-1) | (P-2) | (P-2) |
| Overcoat composition | (2-1) | (2-2) | (2-3) | (2-2) | (2-3) |
| Adhesion test | 100/100 | 100/100 | 100/100 | 100/100 | 100/100 |
| Abrasion resistance test | A | A | A-B | A | A-B |
| Moisture resistance test | AA | A | A | A | A |

TABLE 3(1)-continued

| | | Examples | | | | |
|---|---|---|---|---|---|---|
| | | 1 | 2 | 3 | 4 | 5 |
| Warm-water resistance test | Adhesion | 100/100 | 100/100 | 100/100 | 100/100 | 100/100 |
| | Appearance | A | A | A | A | A |

TABLE 3(2)

| | Example | Comparative Examples | | | |
|---|---|---|---|---|---|
| | 6 | 1 | 2 | 3 | 4 |
| Coated plate | (P-3) | (P-4) | (P-5) | (P-1) | (P-2) |
| Overcoat composition | (2-3) | (2-1) | (2-2) | (2-4) | (2-5) |
| Adhesion test | 100/100 | 20/100 | 30/100 | 100/100 | 100/100 |
| Abrasion resistance test | A-B | A | A | C | C |
| Moisture resistance test | A | A-B | A-B | A-B | A-B |
| Warm water resistance test Adhesion | 100/100 | 10/100 | 10/100 | 30/100 | 20/100 |
| Appearance | A | C | C | C | C |

According to the method of forming a 2-way coat of the invention, a film excellent in abrasion resistance, interlayer adhesion between a colored layer and an overcoat composition and adhesion with a thermoplastic resin base can be obtained. It is particularly useful for coating of a thermoplastic resin-molded article such as mobile phone.

While the invention has been described in detail and with reference to specific examples thereof, it will be apparent to one skilled in the art that various changes and modifications can be made therein without departing from the spirit and scope thereof.

What is claimed is:

1. A method of forming a two-layer coat, which comprises the steps of:
    applying (1) a coating composition onto a thermoplastic resin base and drying said coating to form a colored layer, said coating composition (1) comprising:
        (A) an acrylic resin obtained by copolymerization of a monomer mixture comprising n-butyl (meth)acrylate and methyl (meth)acrylate, each in an amount of at least 35 wt. %;
        (B) a colorant; and
        (C) an organic solvent;
    applying (2) an energy beam curable overcoat composition onto said colored layer, said overcoat composition (2) comprising:
        (D) a compound having at least three (meth)acryloyl groups and having a molecular weight of 250 to 1,800; and
        (E) an acrylic resin obtained by copolymerization of a monomer mixture comprising at least 20 wt. % of methyl (meth)acrylate, said compound (D) amounting to at least 50 wt. % of overcoat film-forming components; and
    curing said applied overcoat composition by energy beam irradiation.

2. The method according to claim 1, wherein said compound (D) is at least one (meth)acrylate compound selected from the group consisting of:
    (D1) (meth)acrylate compounds having a molecular weight of 550 to 1,800 which is obtained by reacting a compound having at least two isocyanate groups and a hydroxyl-containing (meth)acrylate compound in a combination that gives a total number of (meth)acryloyl groups of at least three;
    (D2) (meth)acrylate compounds having a molecular weight of 250 to 1,800 which is obtained by reacting at least three alcoholic hydroxyl groups of a polyol having at least three alcoholic hydroxyl groups with (meth)acrylic acid; and
    (D3) (meth)acrylate compounds having a molecular weight of 550 to 1,800 which is obtained by reacting an epoxy compound having at least three epoxy groups with (meth)acrylic acid.

3. The method according to claim 2, wherein said compound (D) has four to six (meth)acryloyl groups.

4. The method according to claim 1, wherein said acrylic resin (E) is obtained by copolymerization of a monomer mixture comprising methyl (meth)acrylate and n-butyl (meth)acrylate, each in an amount of at least 20 wt. %.

5. The method according to claim 3, wherein said acrylic resin (E) is obtained by copolymerization of a monomer mixture comprising methyl (meth)acrylate and n-butyl (meth)acrylate, each in an amount of at least 20 wt. %.

6. The method according to claim 1, wherein a weight ratio ((D)/(E)) of said (meth)acrylate compound (D) to said acrylic resin (E) is from 95/5 to 50/50.

7. The method according to claim 5, wherein a weight ratio ((D)/(E)) of said (meth)acrylate compound (D) to said acrylic resin (E) is from 95/5 to 50/50.

8. The method according to claim 1, wherein said acrylic resin (A) is obtained by reacting a monomer mixture comprising n-butyl (meth)acrylate and methyl (meth)acrylate, each in an amount of at least 35 wt. % and in a total amount thereof of at least 80 wt. %; and said acrylic resin (E) is obtained by reacting a monomer mixture comprising n-butyl (meth)acrylate and methyl (meth)acrylate, each in an amount of at least 35 wt. % and in a total amount thereof of at least 80 wt. %.

9. The method according to claim 5, wherein said acrylic resin (A) is obtained by reacting a monomer mixture comprising n-butyl (meth)acrylate and methyl (meth)acrylate, each in an amount of at least 35 wt. % and in a total amount thereof of at least 80 wt. %; and said acrylic resin (E) is obtained by reacting a monomer mixture comprising n-butyl (meth)acrylate and methyl (meth)acrylate, each in an amount of at least 35 wt. % and in a total amount thereof of at least 80 wt. %.

10. The method according to claim 7, wherein said acrylic resin (A) is obtained by reacting a monomer mixture comprising n-butyl (meth)acrylate and methyl (meth)acrylate, each in an amount of at least 35 wt. % and in a total amount thereof of at least 80 wt. %; and said acrylic resin (E) is obtained by reacting a monomer mixture comprising n-butyl (meth)acrylate and methyl (meth)acrylate, each in an amount of at least 35 wt. % and in a total amount thereof of at least 80 wt. %.

11. The method according to claim 8, wherein a weight ratio ((D)/(E)) of said (meth)acrylate compound (D) to said acrylic resin (E) is from 92/8 to 55/45.

12. The method according to claim 9, wherein a weight ratio ((D)/(E)) of said (meth)acrylate compound (D) to said acrylic resin (E) is from 92/8 to 55/45.

13. The method according to claim 1, wherein said thermoplastic resin base is a thermoplastic resin-molded article obtained from an acrylonitrile-butadiene-styrene resin or a polymer alloy containing an ABS resin.

14. The method according to claim 8, wherein said thermoplastic resin base is a thermoplastic resin-molded article obtained from an acrylonitrile-butadiene-styrene resin or a polymer alloy containing an ABS resin.

15. The method according to claim 9, wherein said thermoplastic resin base is a thermoplastic resin-molded article obtained from an acrylonitrile-butadiene-styrene resin or a polymer alloy containing an ABS resin.

16. The method according to claim 10, wherein said thermoplastic resin base is a thermoplastic resin-molded article obtained from an acrylonitrile-butadiene-styrene resin or a polymer alloy containing an ABS resin.

* * * * *